(12) United States Patent
Hamada et al.

(10) Patent No.: US 7,983,347 B2
(45) Date of Patent: *Jul. 19, 2011

(54) MULTIPLE DIFFERENTIAL TRANSMISSION SYSTEM INCLUDING SIGNAL TRANSMITTER AND SIGNAL RECEIVER CONNECTED VIA THREE SIGNAL LINES

(75) Inventors: Seiji Hamada, Osaka (JP); Shin-ichi Tanimoto, Kyoto (JP); Hirotsugu Fusayasu, Kyoto (JP)

(73) Assignee: Panasonic Corporation, Osaka (JP)

( * ) Notice: Subject to any disclaimer, the term of this patent is extended or adjusted under 35 U.S.C. 154(b) by 431 days.

This patent is subject to a terminal disclaimer.

(21) Appl. No.: 12/092,511

(22) PCT Filed: Apr. 25, 2007

(86) PCT No.: PCT/JP2007/058964
§ 371 (c)(1),
(2), (4) Date: Jul. 15, 2008

(87) PCT Pub. No.: WO2007/125963
PCT Pub. Date: Nov. 8, 2007

(65) Prior Publication Data
US 2009/0122199 A1 May 14, 2009

(30) Foreign Application Priority Data
Apr. 27, 2006 (JP) .................. 2006-123169

(51) Int. Cl.
*H04B 14/06* (2006.01)
*H04L 25/06* (2006.01)
(52) U.S. Cl. ........................ 375/244; 375/318
(58) Field of Classification Search ............ 375/219, 375/257, 318, 377
See application file for complete search history.

(56) References Cited

U.S. PATENT DOCUMENTS

| 5,166,956 | A | 11/1992 | Baltus et al. |
| 6,317,465 | B1 | 11/2001 | Akamatsu et al. |
| 6,556,628 | B1 | 4/2003 | Poulton et al. |

(Continued)

FOREIGN PATENT DOCUMENTS

EP 0 458 390 11/1991

(Continued)

OTHER PUBLICATIONS

International Search Report issued Jun. 5, 2007 in International (PCT) Application No. PCT/JP2007/058964.

(Continued)

*Primary Examiner* — Khanh C Tran
(74) *Attorney, Agent, or Firm* — Wenderoth, Lind & Ponack, L.L.P.

(57) ABSTRACT

In a signal transmitter for a multiple differential transmission system including the signal transmitter, a signal receiver, and a signal transmission path including first to third signal lines, first to third differential driver transmit first to third output signals and inverted first to third output signals from the first to third output signals responsive to first to third bit information signals, the first output signal and the inverted third output signal are combined and transmitted to the first signal line, the second output signal and the inverted first output signal are combined and transmitted to the second signal line, and the third output signal and the inverted third output signal are combined and transmitted to the first signal line. The first to third differential drivers of the signal receiver detect polarities of terminal voltages generated across terminal resistances connected between adjacent signal lines and output bit information signals.

5 Claims, 13 Drawing Sheets

U.S. PATENT DOCUMENTS

| | | | |
|---|---|---|---|
| 6,775,328 B1 * | 8/2004 | Segaram | 375/257 |
| 0,239,374 A1 | 12/2004 | Hori | |
| 7,627,043 B2 * | 12/2009 | Horowitz et al. | 375/257 |
| 7,692,563 B2 * | 4/2010 | Hamada et al. | 341/56 |
| 7,781,677 B2 * | 8/2010 | Matsubara et al. | 174/113 R |
| 2009/0003464 A1 * | 1/2009 | Matsubara et al. | 375/257 |

FOREIGN PATENT DOCUMENTS

| | | |
|---|---|---|
| JP | 4-230147 | 8/1992 |
| JP | 6-261092 | 9/1994 |
| JP | 3507687 | 12/2003 |
| JP | 2005-333508 | 12/2005 |
| WO | 01/97391 | 12/2001 |

OTHER PUBLICATIONS

Extended European Search Report issued Mar. 22, 2011 in European Patent Application No. 07 74 2399, which is a foreign counterpart of the present application.

* cited by examiner

*Fig.2*
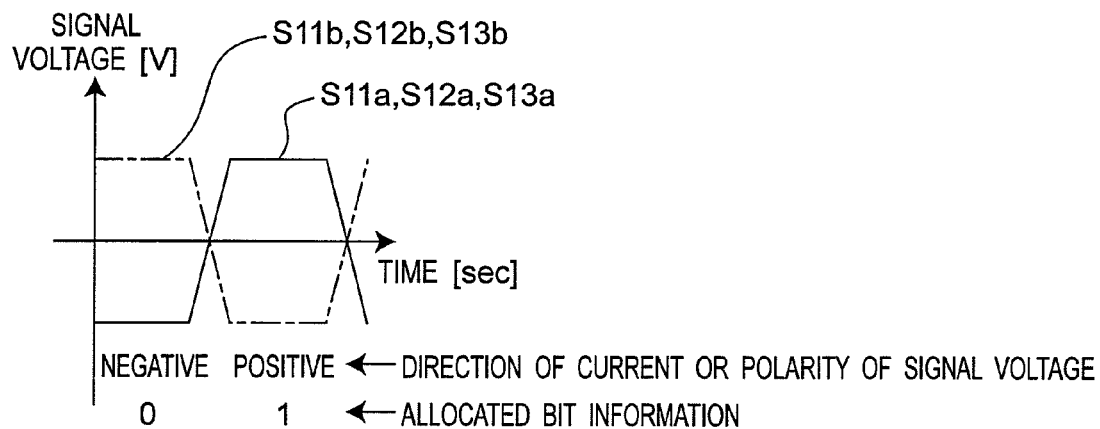
*Fig.3*
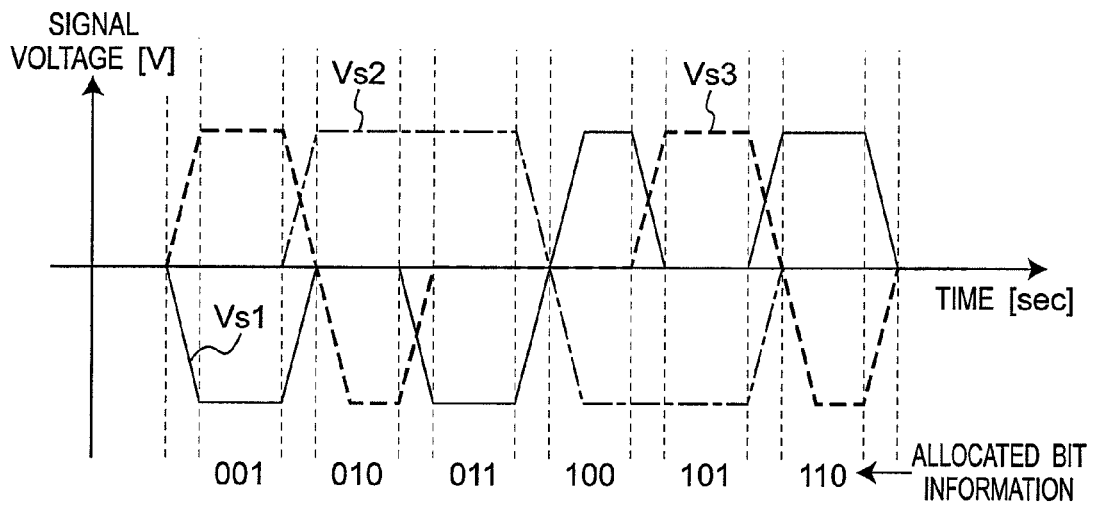
*Fig.4*
| B1 | B2 | B3 | Vs1[V] | Vs2[V] | Vs3[V] |
|---|---|---|---|---|---|
| 0 | 0 | 0 | 0 | 0 | 0 |
| 0 | 0 | 1 | −1 | 0 | 1 |
| 0 | 1 | 0 | 0 | 1 | −1 |
| 0 | 1 | 1 | −1 | 1 | 0 |
| 1 | 0 | 0 | 1 | −1 | 0 |
| 1 | 0 | 1 | 0 | −1 | 1 |
| 1 | 1 | 0 | 1 | 0 | −1 |
| 1 | 1 | 1 | 0 | 0 | 0 |

Fig.5
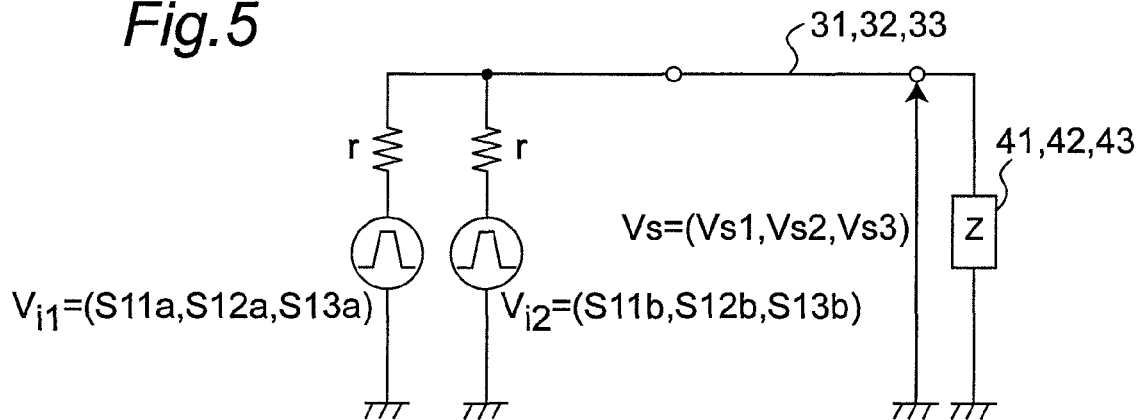
Fig.6
| B1 | B2 | B3 | POLARITY OF V1 | POLARITY OF V2 | POLARITY OF V3 |
|----|----|----|----|----|----|
| 0 | 0 | 1 | − | − | + |
| 0 | 1 | 0 | − | + | − |
| 0 | 1 | 1 | − | + | + |
| 1 | 0 | 0 | + | − | − |
| 1 | 0 | 1 | + | − | + |
| 1 | 1 | 0 | + | + | − |
Fig.7
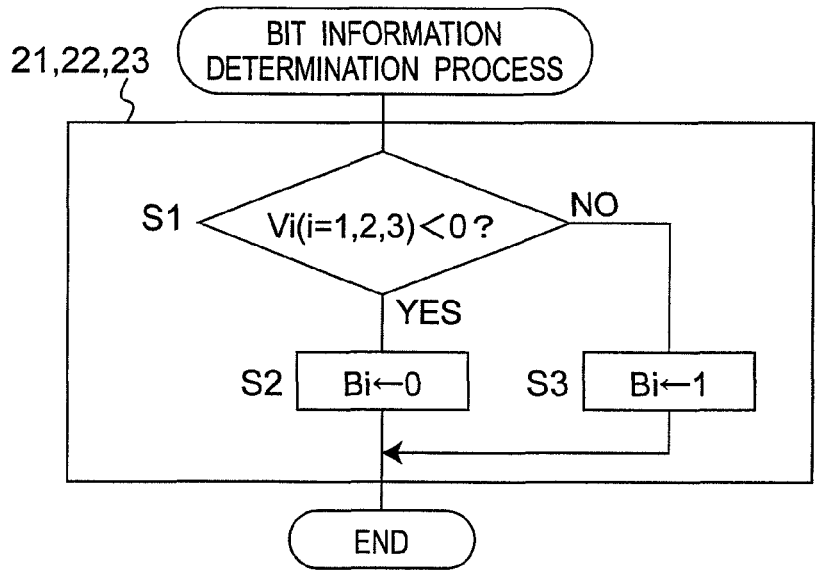

Fig. 11

| B1 | B2 | B3 | Vs1[V] | Vs2[V] | Vs3[V] | V1[V] | V2[V] | V3[V] | POLARITY OF V1 | POLARITY OF V2 | POLARITY OF V3 |
|---|---|---|---|---|---|---|---|---|---|---|---|
| 0 | 0 | 0 | 0.25 | 0 | -0.25 | 0.25 | 0.25 | -0.5 | + | + | - |
| 0 | 0 | 1 | -1.25 | 0 | 1.25 | -1.25 | -1.25 | 2.5 | - | - | + |
| 0 | 1 | 0 | 0.25 | 1 | -1.25 | -0.75 | 2.25 | -1.5 | - | + | - |
| 0 | 1 | 1 | -1.25 | 1 | 0.25 | -2.25 | 0.75 | 1.5 | - | + | + |
| 1 | 0 | 0 | 1.25 | -1 | -0.25 | 2.25 | -0.75 | -1.5 | + | - | - |
| 1 | 0 | 1 | -0.25 | -1 | 1.25 | 0.75 | -2.25 | 1.5 | + | - | + |
| 1 | 1 | 0 | 1.25 | 0 | -1.25 | 1.25 | 1.25 | -2.5 | + | + | - |
| 1 | 1 | 1 | -0.25 | 0 | 0.25 | -0.25 | -0.25 | 0.5 | - | - | + |

*Fig.15*

| B1 | B2 | B3 | Vs1[V] | Vs2[V] | Vs3[V] | V1[V] | V2[V] | V3[V] | POLARITY OF V1 | POLARITY OF V2 | POLARITY OF V3 |
|---|---|---|---|---|---|---|---|---|---|---|---|
| 0 | 0 | 0 | -0.1 | 0 | 0.1 | -0.1 | -0.1 | 0.2 | − | − | + |
| 0 | 0 | 1 | -0.9 | 0 | 0.9 | -0.9 | -0.9 | 1.8 | − | − | + |
| 0 | 1 | 0 | -0.1 | 1 | -0.9 | -1.1 | 1.9 | -0.8 | − | + | − |
| 0 | 1 | 1 | -0.9 | 1 | -0.1 | -1.9 | 1.1 | 0.8 | − | + | + |
| 1 | 0 | 0 | 0.9 | -1 | 0.1 | 1.9 | -1.1 | -0.8 | + | − | − |
| 1 | 0 | 1 | 0.1 | -1 | 0.9 | 1.1 | -1.9 | 0.8 | + | − | + |
| 1 | 1 | 0 | 0.9 | 0 | -0.9 | 0.9 | 0.9 | -1.8 | + | + | − |
| 1 | 1 | 1 | 0.1 | 0 | -0.1 | 0.1 | 0.1 | -0.2 | + | + | − |

MULTIPLE DIFFERENTIAL TRANSMISSION SYSTEM INCLUDING SIGNAL TRANSMITTER AND SIGNAL RECEIVER CONNECTED VIA THREE SIGNAL LINES

TECHNICAL FIELD

The present invention relates to a multiple differential transmission system for differentially transmitting bit information signals of three bits via a signal transmission path including three signal lines.

BACKGROUND ART

In recent years, a signal rate for transferring image information has been accelerated as a quality of a flat panel display typified by a liquid crystal television or a plasma television is improved from VGA (Video Graphics Array) to XGA (extended Graphics Array). Accordingly, a low-amplitude differential transmission method has been adopted as a method of transmitting digital data at high rate.

This is a transmission method for transmitting signals having phases opposite to each other through one balanced cable or two signal line patterns formed on a printed circuit board. The transmission method is characterized by low noise, high resistance against external noise, low voltage amplitude, high data transmission rate, and the like. The transmission method is introduced, in particular, in the field of display to transmit data at high transmission rate.

Patent Document 1: Japanese patent No. JP-3507687-B; and
Patent Document 2: Japanese patent laid-open publication No. JP-4-230147-A.

DISCLOSURE OF THE INVENTION

Problems to be Solved by the Invention

A differential transmission method has many advantages in high rate transmission over an ordinary single-end transmission method. However, it is necessary to provide two signal lines for transmission of one data bit. Due to this, the differential transmission method has such problems as increase in the number of signal lines, increase in a signal line area on a printed circuit board, and the like, in order to realize the multiple-bit transmission. These problems should be overcome to realize higher rate transmission in the future.

As regards these problems, in a differential data transmission method disclosed in the Patent Document 1, two data-bit transmission is realized by three data signal lines with one signal line used as a complementary data line out of the three data signal lines (while it is necessary to provide four data signal lines for the differential transmission method of the prior art). The differential data transmission method disclosed in the Patent Document 1 thereby decreases the number of data signal lines. However, the differential data transmission method disclosed in the Patent Document 1 has such problems as greater radiation noise than those seen in the ordinary differential transmission because the balance can not made among signals carried on the three data signal lines.

In addition, the Patent Document 2 discloses differential transmission of bit information signals of three bits using three signal lines. However, the technique has such a restriction that it is necessary to make output signals from three differential drivers all different. Each of the three bits can only transmit a state of either 0 or 1. The three bits can transmit only six states because the states of 0 or 1 of all the three bits are excluded from their eight states. As a result, the technique disclosed in the Patent Document 2 is confronted with great problems before being put to practical use.

It is a first object of the present invention to provide a multiple differential transmission system capable of realizing differential transmission of bit information signals of three bits using three signal lines, and a signal transmitter and a signal receiver employed in the multiple differential transmission system for overcoming the above-stated problems, to suppress occurrence of noise, and to be able to further decrease the number of data signal lines.

It is a second object of the present invention to provide a multiple differential transmission system capable of realizing differential transmission of bit information signals of three bits using three signal lines and transmitting all states of the three bits, and a signal transmitter and a signal receiver employed in the multiple differential transmission system for overcoming the above-stated problems, to suppress occurrence of noise, and to be able to further decrease the number of data signal lines.

Means for Solving the Problems

According to the first aspect of the present invention, there is provided a signal transmitter for use in a multiple differential transmission system including the signal transmitter, a signal receiver, and a signal transmission path. The signal transmission path includes first, second, and third signal lines for connecting the signal transmitter to the signal receiver. The signal transmitter includes first, second and third differential drivers. The first differential driver transmits a first output signal and an inverted first output signal that is a phase-inverted signal with respect to the first output signal, in response to a first bit information signal. The second differential driver transmits a second output signal and an inverted second output signal that is a phase-inverted signal with respect to the second output signal, in response to a second bit information signal. The third differential driver transmits a third output signal and an inverted third output signal that is a phase-inverted signal with respect to the third output signal, in response to a third bit information signal. The signal transmitter combines the first output signal and the inverted third output signal, and transmits a resulting combined signal to the first signal line. The signal transmitter combines the second output signal and the inverted first output signal, and transmits a resulting combined signal to the second signal line. The signal transmitter combines the third output signal and the inverted second output signal, and transmits a resulting combined signal to the third signal line.

In the above-mentioned signal transmitter, the first output signal and the inverted first output signal, the second output signal and the inverted second output signal, and the third output signal and the inverted third output signals have same binary signal voltages as each other, respectively.

In addition, in the above-mentioned signal transmitter, the first output signal and the inverted first output signal and the second output signal and the inverted second output signal have same binary signal voltages as each other, respectively. The third output signal and the inverted third output signals have binary signal voltages different from each other.

According to the second aspect of the present invention, there is provided a signal receiver for use in a multiple differential transmission system including a signal transmitter, the signal receiver, and a signal transmission path. The signal transmission path includes first, second, and third signal lines for connecting the signal transmitter to the signal receiver. The signal receiver includes first to third differential receivers. The first differential receiver detects a polarity of a terminal voltage generated across a first terminal resistance connected between the first signal line and the second signal line, and outputs a detection result as a first bit information signal. The second differential receiver detects a polarity of a terminal voltage generated across a second terminal resistance connected between the second signal line and the third signal line, and outputs a detection result as a second bit information signal. The third differential receiver detects a polarity of a terminal voltage generated across a third terminal resistance connected between the third signal line and the first signal line, and outputs a detection result as a third bit information signal.

In the above-mentioned signal receiver, the signal receiver receives the respective output signals from the signal transmitter.

In addition, in the above-mentioned signal receiver receiving the respective output signals from the signal transmitter, the signal receiver further includes comparison means, and control means. The comparison means determines whether or not an absolute value of the third terminal voltage generated across the third terminal resistance exceeds a predetermined threshold voltage. The control means outputs the first, the second, and the third bit information signals outputted from the first, the second, and the third differential receivers, respectively when the absolute value of the third terminal voltage does not exceed the predetermined threshold voltage, and the control means outputs the third bit information signal outputted from the third differential receiver as the first, the second, and the third bit information signals when the absolute value of the third terminal voltage exceeds the predetermined threshold voltage. An absolute value of a binary signal voltage of the third output signal is set to be higher than half an absolute value of a binary signal voltage of the first output signal, and the threshold voltage is set to be higher than an absolute value of a difference between the binary signal voltage of the first output signal and the binary signal voltage of the third output signal.

Further, in the above-mentioned signal receiver receiving the first, the second, and the third output signals from the signal transmitter, the signal receiver further includes comparison means, and control means. The comparison means determines whether or not an absolute value of the second terminal voltage generated across the second terminal resistance exceeds a predetermined threshold voltage. The control means outputs the first, the second, and the third bit information signals outputted from the first, the second, and the third differential receivers, respectively when the absolute value of the second terminal voltage does not exceed the predetermined threshold voltage, and the control means outputs the third information bit information signal outputted from the third differential receiver as the first, the second, and the third bit information signals when the absolute value of the second terminal voltage exceeds the predetermined threshold voltage. An absolute value of a binary signal voltage of the third output signal is set to be higher than half an absolute value of a binary signal voltage of the first output signal.

According to a third aspect of the present invention, there is provided a multiple differential transmission system including the signal transmitter, and the signal receiver.

Effects of the Invention

The multiple differential transmission system according to the present invention can differentially transmit bit information signals of three bits using three signal lines, and differentially transmit multiple bits in such a state as suppressing noise increase using fewer signal lines than those used in the prior arts.

BRIEF DESCRIPTION OF THE DRAWINGS

FIG. 2 is a waveform diagram showing a relationship among signal waveforms of output signals S11a, S11b, S12a, S12b, S13a, and S13b from respective differential drivers 11, 12, and 13 shown in FIG. 1, the definition of a direction of a current or a polarity of voltage, and allocated bit information.

FIG. 3 is a waveform diagram showing a relationship among signal waveforms of signal voltages Vs1, Vs2, and Vs3 of transmitted signals via signal lines 31, 32, and 33 of a signal transmission path 30 shown in FIG. 1, respectively, and allocated bit information.

FIG. 4 is a diagram showing a relationship between bit information transmitted in the multiple differential transmissions system shown in FIG. 1 and the signal voltages Vs1, Vs2, and Vs3 of the transmitted signals via the respective signal lines 31, 32, and 33 of the signal transmission path 30.

FIG. 5 is a circuit diagram showing an equivalent circuit of a signal transmitter 10 and the signal lines 31, 32, and 33 shown in FIG. 1 so as to explain the signal voltages Vs1, Vs2, and Vs3 on the signal lines 31, 32, and 33, respectively.

FIG. 6 is a diagram showing a relationship between the bit information transmitted in the multiple differential transmissions system shown in FIG. 1 and polarities of terminal voltages V1, V2, and V3 across terminal resistances 41, 42, and 43 of the signal receiver 30, respectively.

FIG. 7 is a flowchart showing a bit information determination process executed by each of differential receivers 21, 22, and 23 of the signal receiver 20 shown in FIG. 1.

FIG. 11 is a diagram showing a relationship between bit information transmitted in the multiple differential transmissions system shown in FIG. 8, and the signal voltages Vs1, Vs2, and Vs3 of transmitted signals via the respective signal lines 31, 32, and 33, terminal voltages V1, V2, and V3 and polarities of the terminal voltages V1, V2, and V3 across terminal resistances 41, 42, and 43 of a signal receiver 30, respectively.

FIG. 15 is a diagram showing a relationship among bit information transmitted in a multiple differential transmission system according to a third embodiment of the present invention (similar in configuration to that shown in FIG. 8 but different only in setting conditions), signal voltage Vs1, Vs2, and Vs3 on transmitted signals via the respective signal line 31, 32, and 33, and terminal voltages V1, V2, and V3 and polarities of the terminal voltages V1, V2, and V3 of the respective terminal resistance 41, 42, and 43 of a signal receiver 30.

EXPLANATION OF SYMBOLS 10, and 10A . . . signal transmitter,
11, 12, 13, and 13A . . . differential driver,
20, 20A, and 20B . . . signal receiver,
21, 22, and 23 . . . differential receiver,
24 . . . clock reproduction circuit,
25 . . . comparator,
26, and 27 . . . switch,
28 . . . absolute value calculator,
30 . . . signal transmission path,
31, 32, and 33 . . . signal line,
41, 42, and 43 . . . terminal resistance,
44 . . . threshold voltage source,
50 . . . decoding processor, and
50a . . . program memory.

BEST MODE FOR CARRYING OUT THE INVENTION

Embodiments of the present invention will be described hereinafter with reference to the drawings. In the embodiments, similar components are denoted by the same reference symbols or numerical references, respectively.

First Embodiment

Figure 1:
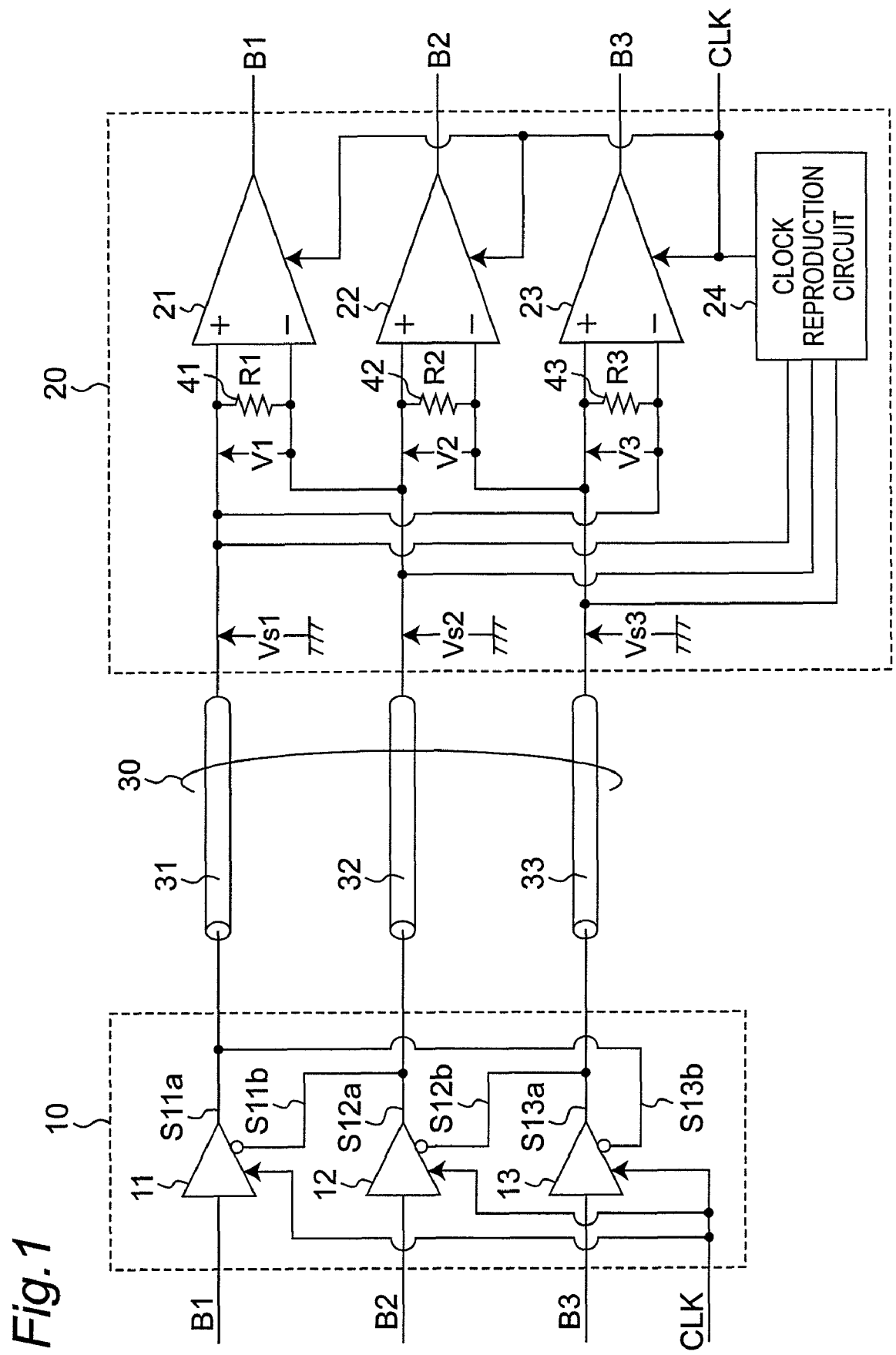
FIG. 1 is a block diagram showing a configuration of a differential transmission system according to a first embodiment of the present invention.

FIG. 1 is a block diagram showing a configuration of a multiple differential transmission system according to a first embodiment of the present invention. Referring to FIG. 1, the multiple differential transmission system according to the first embodiment is configured to connect a signal transmitter 10 to a signal receiver 20 via a signal transmission path 30. The signal transmitter 1 includes the following:

(a) a differential driver 11 that transmits a first output signal S11a and an inverted first output signal S11b that is a phase-inverted signal with respect to the first output signal S11a in response to a bit information signal B1 having either a high level or a low level;

(b) a differential driver 12 that transmits a second output signal S12a and an inverted second output signal S12b that is a phase-inverted signal with respect to the second output signal S12a in response to a bit information signal B2 having either the high level or the low level; and (c) a differential driver 13 that transmits a third output signal S13a and an inverted third output signal S13b that is a phase-inverted signal with respect to the third output signal S13a in response to a bit information signal B3 having either the high level or the low level. The binary voltage levels of the output signals of the differential drivers 11, 12, and 13 are ±1 V so as to be equal to each other, and the differential drivers 11, 12, and 13 operate to transmit the respective output signals at a rising timing of a clock CLK.

The signal transmission path 30 is configured to include signal lines 31, 32, and 33. In this case, the first output signal S11a from the differential driver 11 and the inverted third output signal S13b from the differential driver 13 are combined and transmitted to the signal line 31. The second output signal S12a from the differential driver 12 and the inverted first output signal S11b from the differential driver 11 are combined and transmitted to the signal line 32. The third output signal S13a from the differential driver 13 and the inverted second output signal S12b from the differential driver 12 are combined and transmitted to the signal line 33.

The signal receiver 20 is configured to include three differential receivers 21, 22, and 23, which is bit information determination units (which are configured to include comparators determining whether or not terminal voltages V1, V2, and V3 are negative, respectively as will be described later with reference to FIG. 7), a clock reproduction circuit 24, and three terminal resistances 41, 42, and 43. The terminal resistance 41 is connected between the signal lines 31 and 32, and either a manner of a current flowing in the terminal resistance 41 or a polarity of a terminal voltage V1 generated across the terminal resistance 41 is detected by the differential receiver 21. The terminal resistance 42 is connected between the signal lines 32 and 33, and either a manner of a current flowing in the terminal resistance 42 or a polarity of a terminal voltage V2 generated across the terminal resistance 42 is detected by the differential receiver 22. The terminal resistance 43 is connected between the signal lines 33 and 31, and either a manner of a current flowing in the terminal resistance 43 or a polarity of a terminal voltage V3 generated across the terminal resistance 43 is detected by the differential receiver 23. The clock reproduction circuit 24 is configured to include a rising detection circuit and a PLL circuit, and reproduces the clock having a predetermined cycle by detecting rising edges of transmitted signals via the three signal lines 31, 32, and 33, and then, outputs the reproduced clock CLK to the respective differential receivers 21, 22, and 23. The respective differential receivers 21, 22, and 23 execute bit information determinations, as will be described later, at a rising timing of the input clock CLK, and output the bit information signals B1, B2, and B3.

FIG. 2 is a waveform diagram showing a relationship among signal waveforms of the output signals S11a and S11b, S12a and S12b, and S13a and S13b from the respective differential drivers 11, 12, and 13 shown in FIG. 1, a definition of a direction of a current or the polarity of signal voltage, and allocated bit information. FIG. 3 is a waveform diagram showing a relationship among signal waveforms of signal voltages Vs1, Vs2, and Vs3 of transmitted signals via the signal lines 31, 32, and 33 of the signal transmission path 30, respectively, and allocated bit information. The differential receivers 21, 22, and 23 output the output signals shown in FIG. 2 according to the input bit information signals, respectively. At this time, the signal voltages Vs1, Vs2, and Vs3 transmitted via the signal lines 31, 32, and 33 of the signal transmission path 30 according to the input bit information signals of three bits are shown in FIG. 3, respectively.

FIG. 4 is a diagram showing a relationship between bit information transmitted in the multiple differential transmissions system shown in FIG. 1 and the signal voltages Vs1, Vs2, and Vs3 of the transmitted signals via the respective signal lines 31, 32, and 33 of the signal transmission path 30. FIG. 5 is a circuit diagram showing an equivalent circuit of the signal transmitter 10 and the signal lines 31, 32, and 33 shown in FIG. 1 so as to explain the signal voltages Vs1, Vs2, and Vs3 on the signal lines 31, 32, and 33, respectively. The signal voltages Vs1, Vs2, and Vs3 on the respective signal lines 31, 32, and 33 will now be described with reference to FIGS. 4 and 5.

The signal voltages $V_{i1}$ and $V_{i2}$ from the two differential drivers (11 and 12; 12 and 13; and 13 and 11) are superimposed on the respective signal lines 31, 32, and 33. If it is assumed that an internal resistance of the respective differential drivers 11, 12, and 13 is "r" and an impedance of each of the terminal resistances 41, 42, and 43 of the signal receiver 20 is "Z" (while an input impedance of each of the differential receivers 21, 22, and 23 is infinite (an ideal value), a signal voltage Vs generated on each of the signal lines 31, 32, and 33 is expressed by the following Equation (1):

$$V_S = \frac{V_{i1} + V_{i2}}{r + 2Z} Z \quad (1)$$

In this case, since it can be defined as r<<Z, the Equation (1) is approximated to the following Equation (2):

$$V_S = \frac{1}{2}(V_{i1} + V_{i2}) \quad (2)$$

FIG. 6 is a diagram showing a relationship between the bit information transmitted in the multiple differential transmissions system shown in FIG. 1 and polarities of the terminal voltages V1, V2, and V3 across terminal resistances 41, 42, and 43 of the signal receiver 30, respectively.

As apparent from FIG. 6, the directions of currents or the polarities of the terminal voltages across the terminal resistances 41, 42, and 43 are determined by the potential differences (i.e., terminal voltages across the terminal resistances 41, 42, and 43) generated between adjacent paired signal lines when the signals are superimposed on the three respective signal lines 31, 32, and 33. It is thereby possible to decode the bit information signals outputted from the respective differential drivers 11, 12, and 13 in six states other than such a state as all the bits of zero, and such another state as all the bits of one. In addition, the signal voltages applied to the respective signal lines 31, 32, and 33 of the signal transmission path 30 amount to zero whichever bit information signal is transmitted, and noises radiated from the signal lines 31, 32, and 33 cancel one another. Therefore, it is possible to realize less-noise transmission in a manner similar to that of the ordinary differential transmission method.

FIG. 7 is a flowchart showing a bit information determination process executed by each of the differential receivers 21, 22, and 23 of the signal receiver 20 shown in FIG. 1.

Referring to FIG. 7, each of the differential receivers 21, 22, and 23 determines whether or not a direction of a current flowing in each of the terminal resistances 41, 42, and 43 is negative or determines whether or not a terminal voltage V1 (i=1, 2 or 3) across each of the terminal resistances 41, 42, and 43 is negative in step S1. If the determination result is YES, the process flow goes to step S2, and in step 2, each of the differential receivers 21, 22, and 23 sets 0 to bit information Bi. If the determination result is NO, the process flow goes to step S3, and in step S3 each of the differential receivers 21, 22, and 23 sets 1 to the bit information Bi. Each of the differential receivers 21, 22, and 23 finishes the bit information determination process.

Second Embodiment

Figure 8:
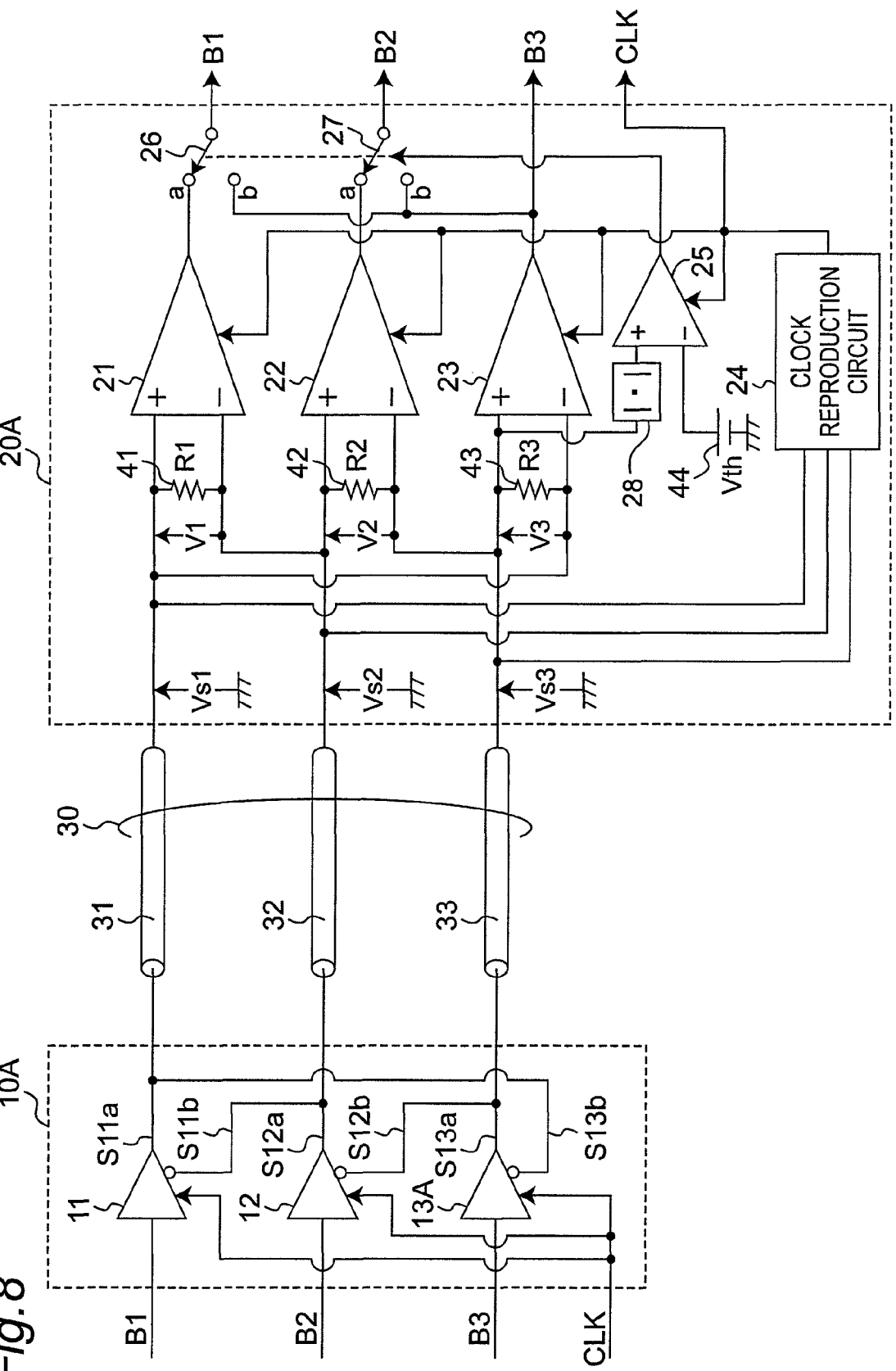
FIG. 8 is a block diagram showing a configuration of a differential transmission system according to a second embodiment of the present invention.

FIG. 8 is a block diagram showing a configuration of a differential transmission system according to a second embodiment of the present invention. Referring to FIG. 8, the multiple differential transmission system according to the second embodiment is configured to connect a signal transmitter 10A to a signal receiver 20A via a signal transmission path 30. The signal transmitter 10A includes three differential drivers 11, 12, and 13A in a manner similar to that of the first embodiment. The method of connecting the differential drivers 11, 12, and 13A to signal lines 31, 32, and 33 is similar to that of the first embodiment. The binary voltage levels of output signals of the differential drivers 11 and 12 are ±1 V so as to be equal to each other, however, the binary voltage levels of the output signal from the differential driver 13 are ±1.5 V so as to be equal to each other, and the absolute value of the binary voltage levels is set to be higher than that of the differential drivers 11 and 12.

Figure 12:
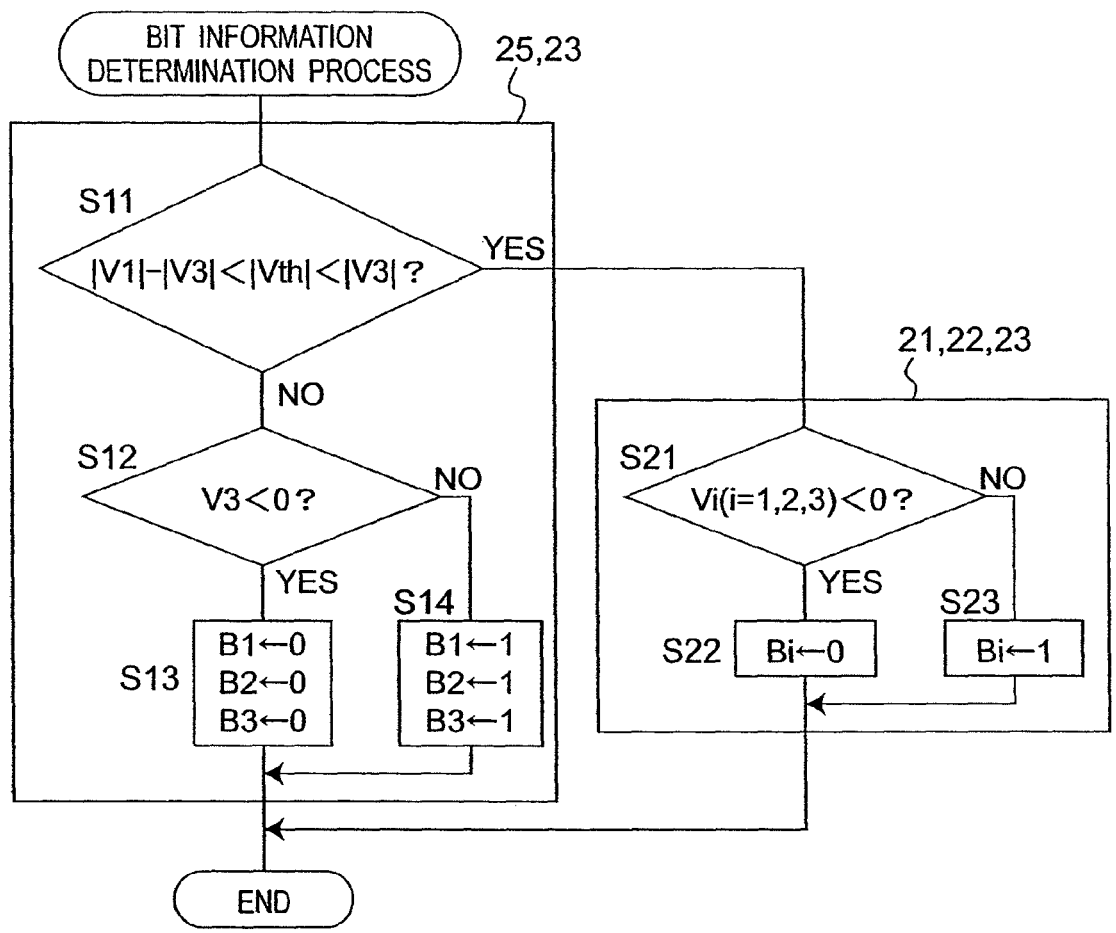
FIG. 12 is a flowchart showing a first implemental example of a bit information determination process executed by each of differential receivers 21, 22, and 23 and a comparator 25 of the signal receiver 20 of the multiple differential transmission system shown in FIG. 8.

The signal receiver 20A is characterized by, as compared with the signal receiver 20 according to the first embodiment, further including a comparator 25 provided with a threshold voltage source 44, switches 26 and 27 controlled to be switched in conjunction with each other by the output signal from the comparator 25, and an absolute value calculator 28. In the second embodiment, after detecting the terminal voltage V3 across the terminal resistance 43, the absolute value calculator 28 calculates the absolute value |V3| of the terminal voltage V3, and then, outputs a voltage signal indicating the absolute value |V3| to a non-inverted input terminal of the comparator 25. The comparator 25 compares the absolute value |V3| of the terminal voltage V3 with a threshold voltage Vth from a threshold voltage source 44. If |V3|>|Vth|, the comparator 25 outputs a high level control signal to the switches 26 and 27, to switch over each of the switches 26 and 27 to the contact "a" thereof. If |V3|≦|Vth|, the comparator 25 outputs a low level control signal to the switches 26 and 27, to switch over each of the switches 26 and 27 to the contact "b" thereof. The three differential receivers 21, 22, and 23 execute bit information determinations, as will be described later, at a rising timing of the input clock CLK, and output bit information signals B1, B2, and B3, respectively. In this case, when the switches 26 and 27 are switched over to the contact "a" thereof (that is, when the determination result in step S11 of FIG. 12 is YES, the process of the steps S21 to S23 is performed), then the bit information signal B1 from the differential receiver 21 is outputted via the contact "a" of the switch 26, the bit information signal B2 from the differential receiver 22 is outputted via the contact "a" of the switch 27, the bit information signal B3 from the differential receiver 23 is outputted as it is. On the other hand, when the switches 26 and 27 are switched over to the contact "b" (that is, when the determination result in step S11 of FIG. 12 is NO, the process of steps S12 to S14 is performed), a bit information signal including a determination result (000 or 111) of the bit information signal B3 from the differential driver 23 is outputted as the bit information signals B1, B2, and B3.

It is assumed that absolute values of the binary signal voltages of the output signals from the respective differential drivers 11, 12, and 13 are Vd1, Vd2, and Vd3. Under setting conditions (Vd3>Vd1 (e.g., Vd1=Vd2=1.0 [V]; Vd3=1.5 M) according to the second embodiment, the method of discriminating the bit information signals 000 and 111 from all the other bit information signals can be executed under the following conditions:

$$|Vd1|=|Vd2|. \quad (1)$$

$$|Vd3|\neq|Vd1|: \quad (2)$$

If Vd3=Vd1, when the bit information signal 000 or 111 is transmitted, the potential differences between the signal lines become zero, and then the determination can not be made.

$$|Vd3|\neq|3Vd1|: \quad (3)$$

If Vd3=3Vd1, when one of bit information signals 010 to 101 is transmitted, the potential differences between the signal lines become zero, and then, the determination cannot be made.

$$|Vd3|>|Vd1|/2: \quad (4)$$

The threshold value |Vth| becomes equal to or lower than zero, and the determination cannot be made.

$$|Vd1-Vd3|<|Vth|: \quad (5)$$

This is the threshold condition, and this leads to that only the comparator 25 and the absolute value calculator 28 can make the determinations.

In the first setting example, the threshold value Vth is set to satisfy 0.5 [V]<Vth<1.0 [V], and Vth is, for example, 0.8 V.

Figure 9:
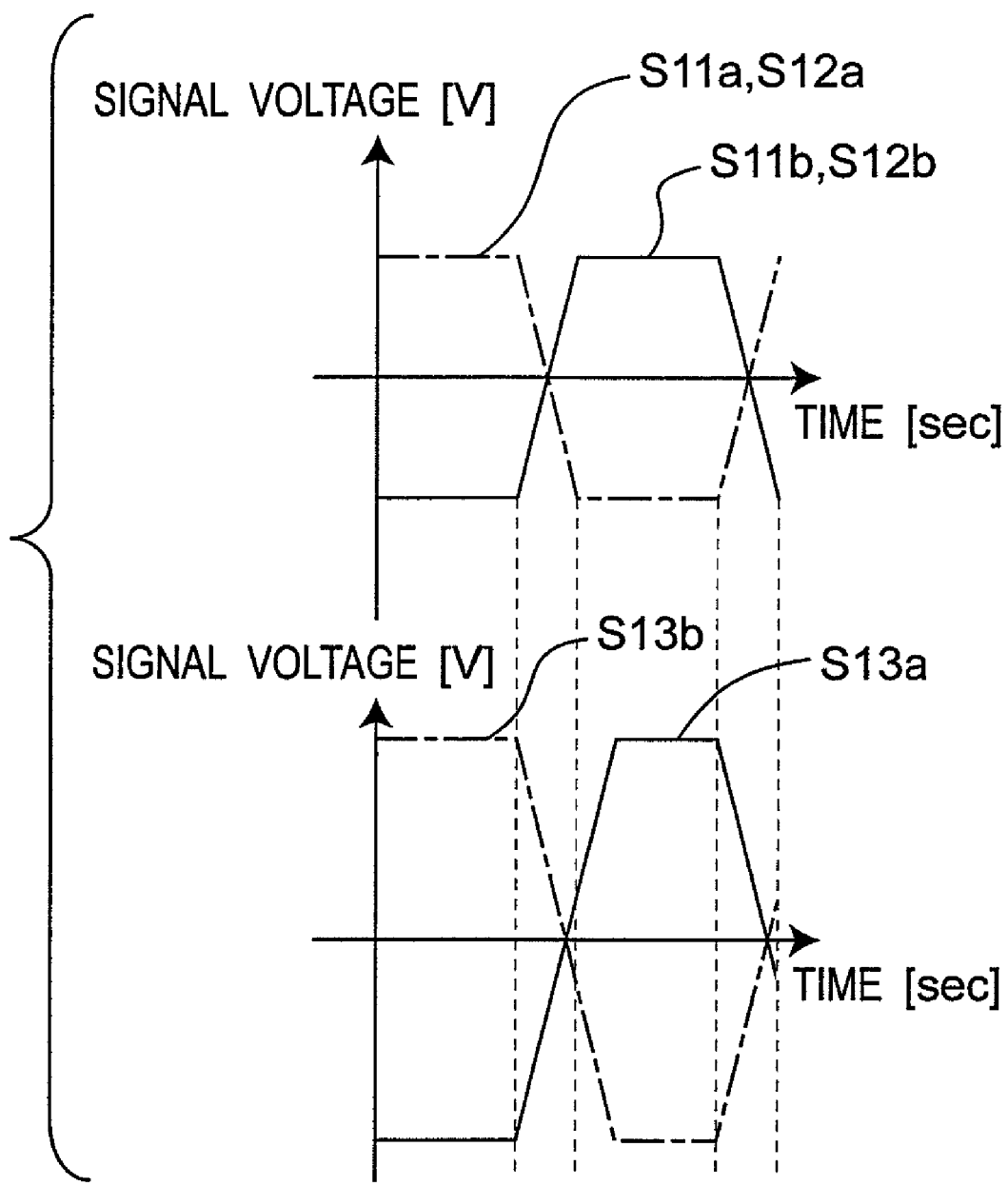
FIG. 9 is a waveform diagram showing signal waveforms of output signals S11a, S11b, S12a, S12b, S13a, and S13b from respective differential drivers 11, 12, and 13A shown in FIG. 8 and allocated bit information.
Figure 10:
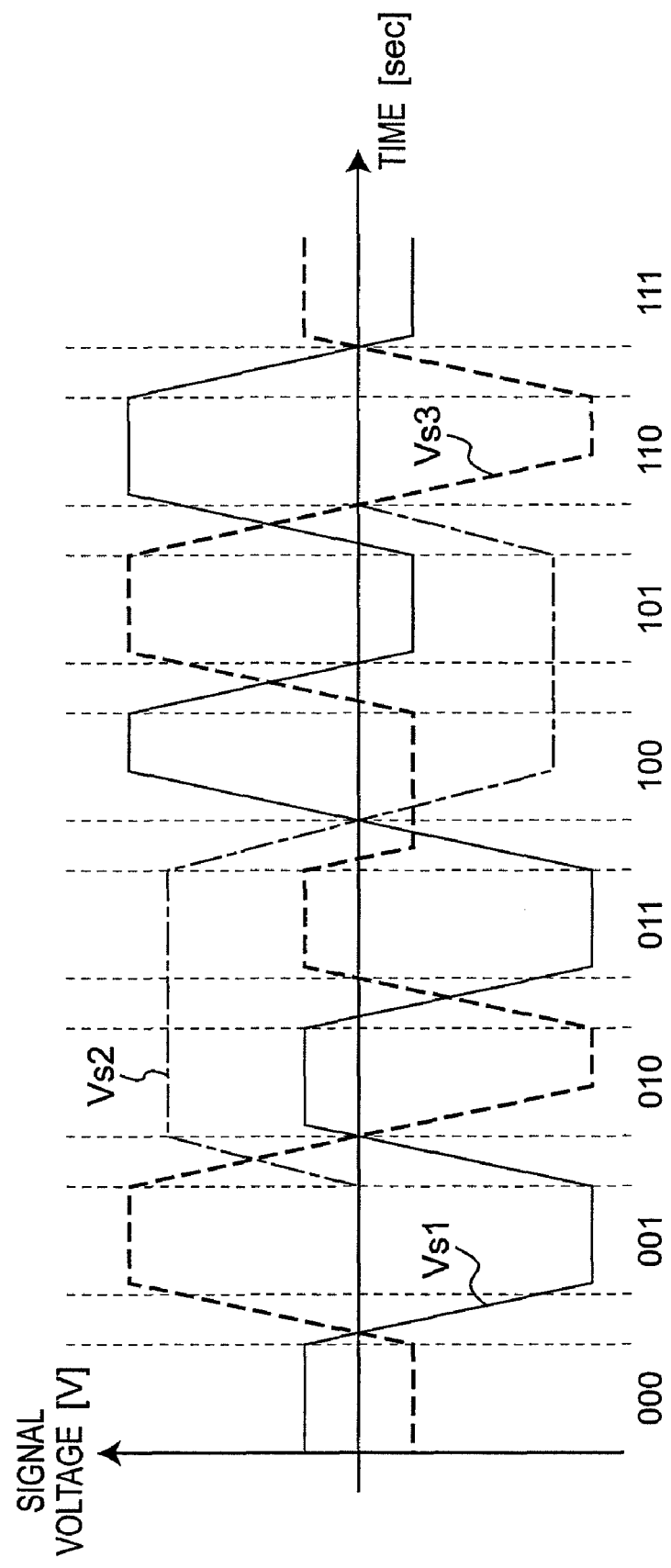
FIG. 10 is a waveform diagram showing a relationship among signal waveforms of signal voltages Vs1, Vs2, and Vs3 of transmitted signals via signal lines 31, 32, and 33 of a signal transmission path 30 shown in FIG. 8, respectively, and allocated bit information.

FIG. 9 is a waveform diagram showing signal waveforms of output signals S11a, S11b, S12a, S12b, S13a, and S13b from the respective differential drivers 11, 12, and 13A shown in FIG. 8 and allocated bit information. FIG. 10 is a waveform diagram showing a relationship among signal waveforms of signal voltages Vs1, Vs2, and Vs3 of transmitted signals via signal lines 31, 32, and 33 of a signal transmission path 30, respectively, and allocated bit information. FIG. 11 is a diagram showing a relationship between bit information transmitted in the multiple differential transmissions system shown in FIG. 8, and the signal voltages Vs1, Vs2, and Vs3 of transmitted signals via the respective signal lines 31, 32, 33, terminal voltages V1, V2, and V3 and polarities of the terminal voltages V1, V2, and V3 of terminal resistances 41, 42, and 43 of a signal receiver 30, respectively.

As stated so far, the signal voltage levels of only one differential driver 13 are made different from those of the other differential drivers 11 and 12, and the multiple differential transmission system includes the circuit elements 25 to 28 that form a full-bit compensation circuit. It is thereby possible to decode bit information signals in all eight states including such a state as all the bits of zero, and such another state as all the bits of one. In addition, the signal voltages applied to the respective signal lines 31, 32, and 33 of the signal transmission path 30 amount to zero whichever bit information signal is transmitted, and noises radiated from the signal lines 31, 32, and 33 cancel one another. Therefore, it is possible to realize less-noise transmission in a manner similar to that of the ordinary differential transmission method.

FIG. 12 is a flowchart showing a first implemental example of a bit information determination process executed by each of the differential receivers 21, 22, and 23 and the comparator 25 of the signal receiver 20 of the multiple differential transmission system shown in FIG. 8.

Referring to FIG. 12, the comparator 25 determines whether or not the absolute value |V3| of the terminal voltage V3 across the terminal resistance 43 exceeds a threshold value Vth in step S11. In the present embodiment, |V1−V3|<|Vth| is set in advance as the above-stated threshold value condition (|Vd1−Vd3|<|Vth|). If the determination result is NO in step S11, the process flow goes to step S12. If the determination result is YES in step S11, the process flow goes to step S21. In step S21, the respective differential drivers 21, 22, and 23 determine whether or not the polarities of the terminal voltages Vi (i=1, 2 or 3) across the terminal resistances 41, 42, and 43 are negative. If the determination result is NO, the process flow goes to step S23, and in step S23 bit information signal Bi is set to one. The bit information determination process is then finished. In step S12, it is determined whether or not the terminal voltage V3 across the terminal resistance 43 is negative. If the determination result of step S12 is YES, the process flow goes to step S13, and in step S13 all the bit information signals B1, B2, and B3 are set to zero. If the determination result of step S12 is NO, the process flow goes to step S14, and in step S14 all the bit information signals B1, B2, and B3 are set to one. The bit information determination process is finished.

Modified Embodiment of Second Embodiment

Figure 13:
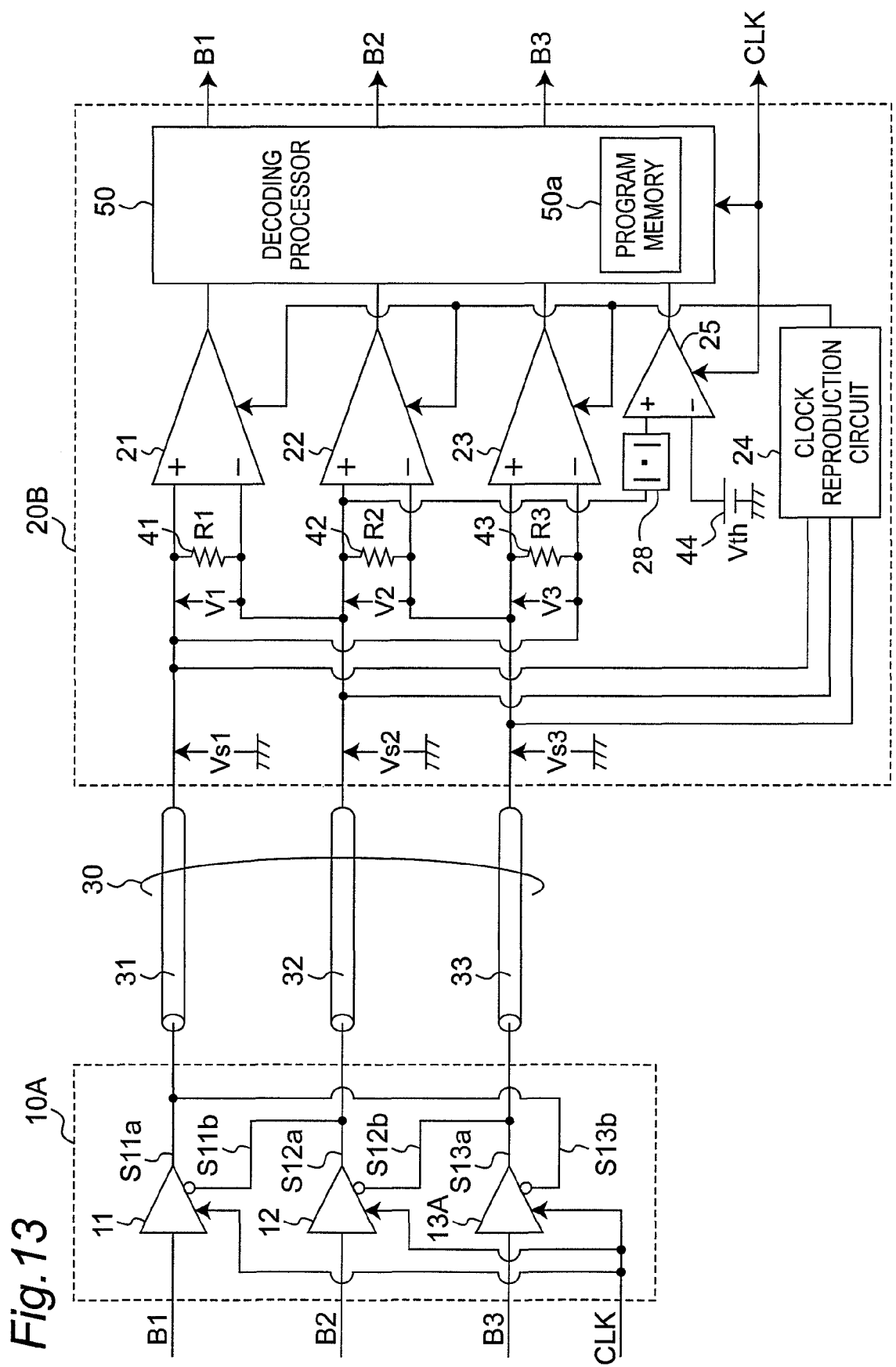
FIG. 13 is a block diagram showing a configuration of a differential transmission system according to a modified embodiment of the second embodiment of the present invention.

FIG. 13 is a block diagram showing a configuration of a differential transmission system according to a modified embodiment of the second embodiment of the present invention. As shown in FIG. 13, the modified embodiment of the second embodiment is characterized, as compared with the second embodiment shown in FIG. 8, in that the signal receiver 20A is replaced by a signal receiver 20B and in that in the signal receiver 20B, the switches 26 and 27 are replaced by a decoding processor 50 including a program memory 50a and performing a bit information determination process (stored in the program memory 50a in advance) shown in FIG. 14. The absolute value calculator 28 detects a terminal voltage V2 across a terminal resistance 42, calculates the absolute value |V2|=|V1+V3| of the terminal voltage V2, and then, outputs a signal indicating the calculation result to a non-inverted input terminal of the comparator 25.

In the modified embodiment of the second embodiment, a method of discriminating bit information signals 000 and 110 from each other and bit information signals 111 and 000 from each other can be executed under the following conditions:

$$|Vd1|=|Vd2| \quad (1)$$

$$|Vd3|\neq|Vd1|: \quad (2)$$

If Vd3=Vd1, when the bit information signal 000 or 111 is transmitted, the potential differences between the signal lines become 0 and determinations cannot be made.

$$|Vd3|\neq|3Vd1|: \quad (3)$$

If Vd3=3Vd1, when one of bit information signals 010 to 101 is transmitted, the potential differences between the signal lines become 0 and determinations cannot be made.

$$|Vd1-Vd3|<|Vth|: \quad (4)$$

This is the threshold condition, and this leads to that only a comparator 25 and the absolute value calculator 28 can make determinations. Referring to FIG. 13, the absolute value calculator 28 calculates the absolute value |V2| of the terminal voltage V2, and then, outputs the calculation result to the comparator 25.

Figure 14:
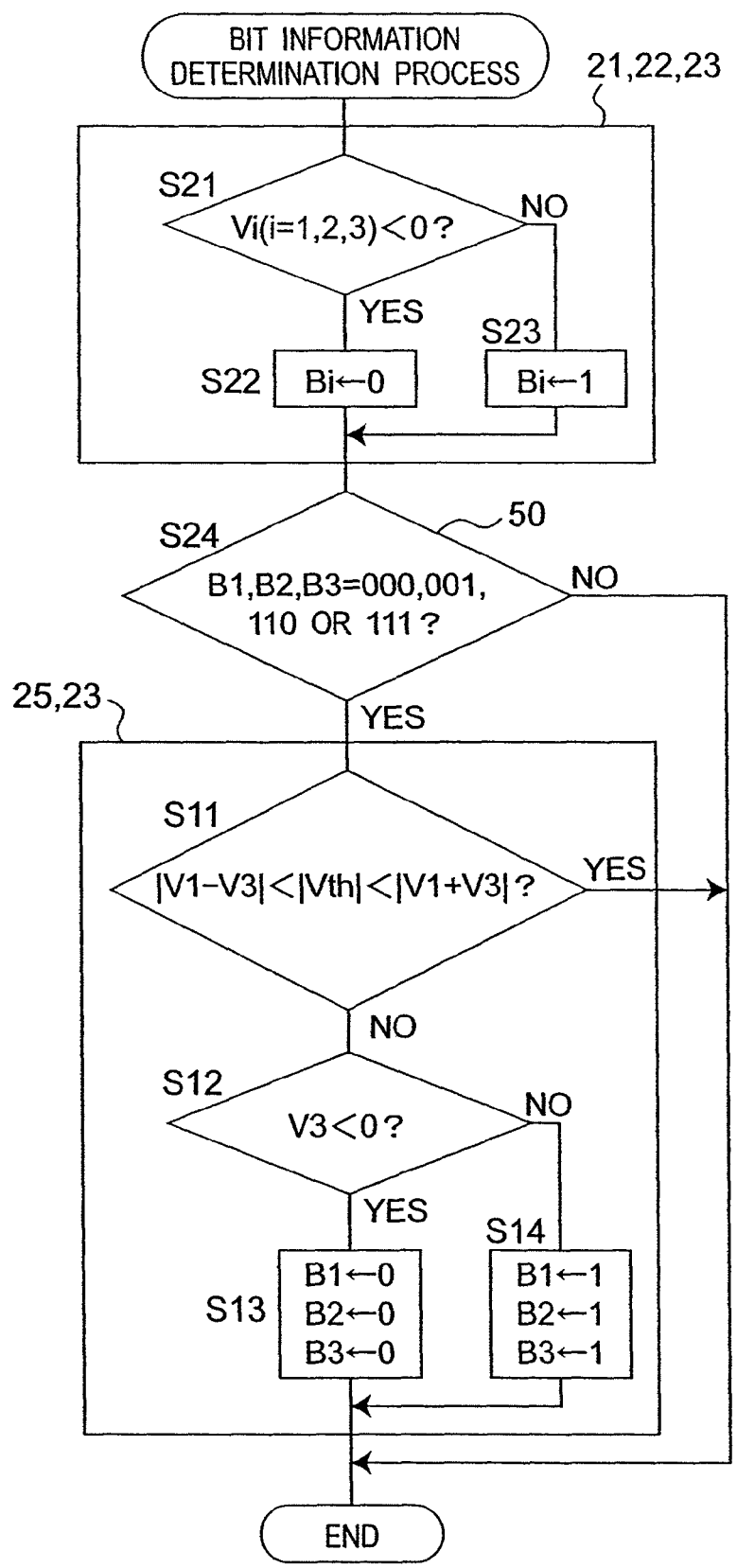
FIG. 14 is a flowchart showing a second implemental example of a bit information determination process executed by a decoding processor 50 of a signal receiver 20 of the multiple differential transmission system shown in FIG. 13.

Referring to FIG. 13, the decoding processor 50, which is configured to include, for example, a CPU or a DSP, executes the bit information determination process stored in the program memory 50a as shown in FIG. 14 based on the respective signals from the differential drivers 21, 22, and 23 and the comparator 25 in synchronous with the clock from the clock reproduction circuit 24, to execute a decoding process and generating and output bit information signals B1, B2, and B3.

FIG. 14 is a flowchart showing a second implemental example of the bit information determination process executed by the decoding processor 50 of the signal receiver 20 of the multiple differential transmission system shown in FIG. 13. Referring to FIG. 14, steps S21 to S23 are processes performed by the differential receivers 21, 22, and 23, step S24 is a process performed only by the decoding processor 50, and steps S11 to S14 are processes performed by the differential receiver 23 and the comparator 25.

Referring to FIG. 14, the respective differential receivers 21, 22, and 23 determine whether or not polarities of terminal voltages Vi (i=1, 2 or 3) across the respective terminal resistances 41, 42, and 43 are negative. If the determination result is YES, the process flow goes to step S22, and in step S22 bit information signal Bi is set to zero. If the determination result is NO, then the process flow goes to step S23, and in step S23 the bit information signal Bi is set to one and the process flow goes to step S24. In step S24, the decoding processor 50 determines whether or not the bit information signals B1, B2, and B3 are 000, 001, 110 or 111. If the determination result is YES, the process flow goes to step S11. If the determination result is NO, the bit information determination process is finished. In step S11, the comparator 25 determines whether or not the absolute value |V2|=|V1+V3| of the terminal voltage V2 across the terminal resistance 43 exceeds the threshold value Vth. In the present modified embodiment, |V1−V3|<|Vth| is set in advance as the above-stated threshold value condition (|Vd1−Vd3|<|Vth|). If the determination result is NO in step S11, the process flow goes to step S12. If the determination result is YES in step S11, the bit information determination process is finished. In step S12, it is determined whether or not the terminal voltage V3 across the terminal resistance 43 is negative. If the determination result is YES, the process flow goes to step S13, and in step S13 all the bit information signals B1, B2, and B3 are set to zero. If the determination result is NO, the process flow goes to step S14, and in step S14 all the bit information signals B1, B2, and B3 are set to one.

Third Embodiment

FIG. 15 is a diagram showing a relationship among bit information transmitted in a multiple differential transmission system according to a third embodiment of the present invention (similar in configuration to that shown in FIG. 8 but different only in setting conditions), signal voltage Vs1, Vs2, and Vs3 of transmitted signals via respective signal line 31, 32, and 33, and terminal voltages V1, V2, and V3 across respective terminal resistance 41, 42, and 43 of a signal receiver 30 and polarities of the terminal voltages V1, V2, and V3 across the respective terminal resistance 41, 42, and 43 of the signal receiver 30. The third embodiment differs from the second embodiment only in the setting conditions and is characterized by setting Vd3≦Vd1 (e.g., Vd1=Vd2=1.0 [V]; and Vd3=0.8 [V]). It is to be noted that the same apparatus configuration as that of the multiple differential transmission system shown in FIG. 8 is used as that of the multiple differential transmission system according to the third embodiment.

Figure 16:
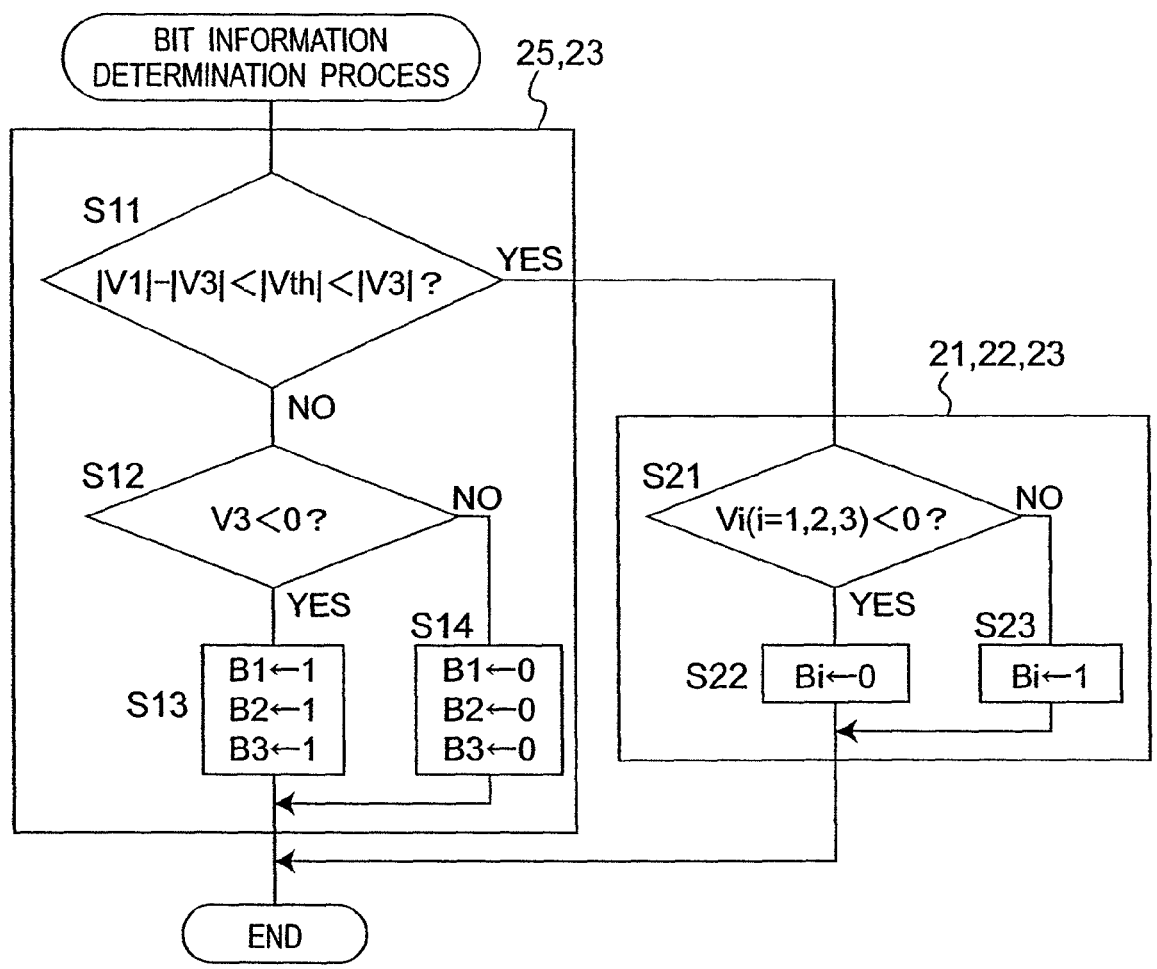
FIG. 16 is a flowchart showing a third implemental example of a bit information determination process executed by each of differential receivers 21, 22, and 23 and a comparator 25 of a signal receiver 20 of the multiple differential transmission system according to the third embodiment.

FIG. 16 is a flowchart showing a third implemental example of a bit information determination process executed by each of differential receivers 21, 22, and 23 and a comparator 25 of a signal receiver 20 of the multiple differential transmission system according to the third embodiment. The bit information determination process shown in FIG. 16 differs from that shown in FIG. 12 in that a process of step S13 is replaced by a process of step S14. The third embodiment configured as stated above exhibits similar functions and advantages as those of the second embodiment.

Modified Embodiment of Third Embodiment

Figure 17:
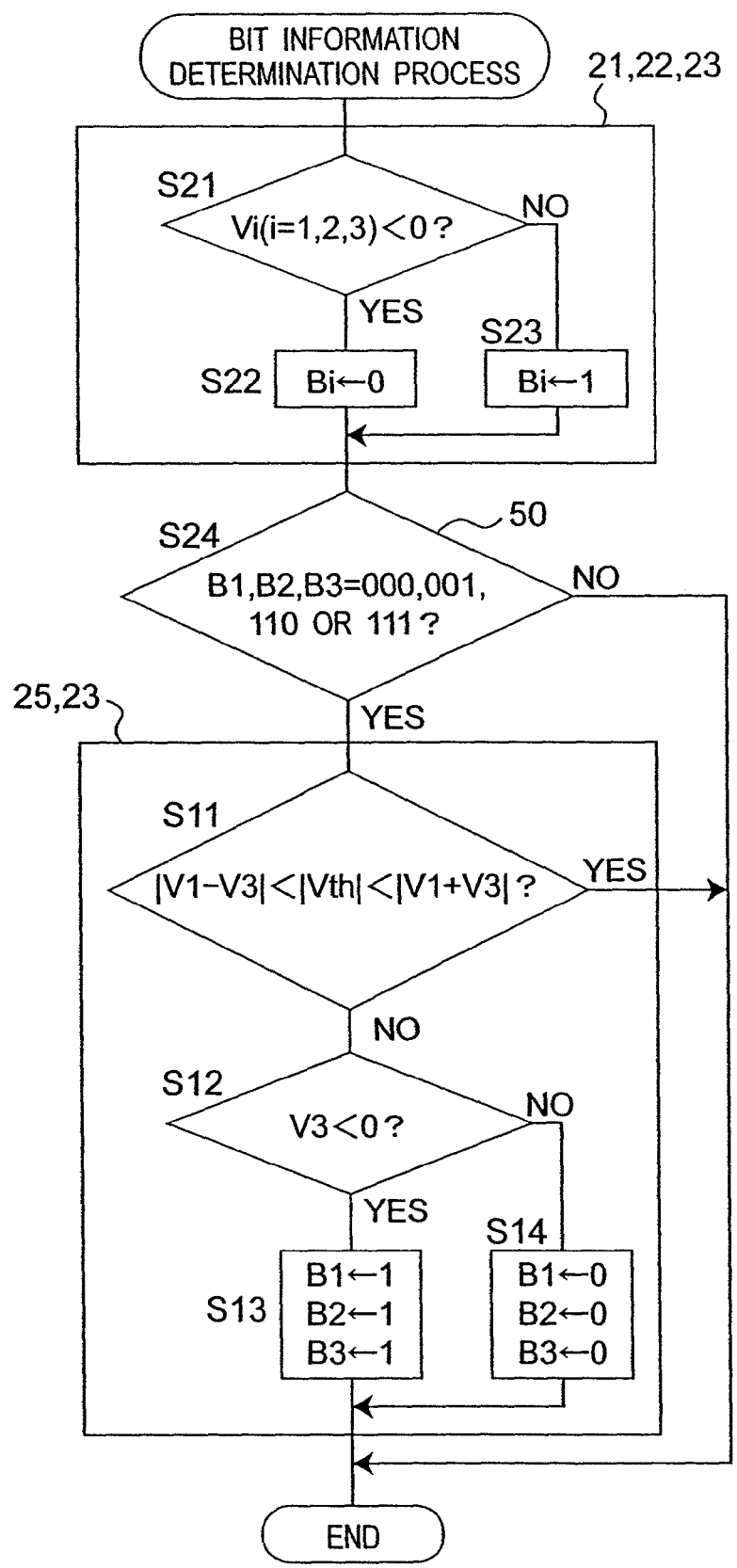
FIG. 17 is a flowchart showing a fourth implemental example of a bit information determination process executed by a decoding processor 50 of a signal receiver 20 of a multiple differential transmission system according to a modified embodiment of the third embodiment of the present invention (similar in configuration to that shown in FIG. 13 but different only in setting conditions).

FIG. 17 is a flowchart showing a fourth implemental example of a bit information determination process executed by a decoding processor 50 of a signal receiver 20 in a multiple differential transmission system according to a modified embodiment of the third embodiment of the present invention (similar in configuration to that shown in FIG. 13 but different only in setting conditions). In this case, the same apparatus configuration as that of the multiple differential transmission system shown in FIG. 13 is used as that of the multiple differential transmission system according to the modified embodiment of the third embodiment. The bit information determination process shown in FIG. 17 differs from that shown in FIG. 13 in that a process of step S13 is replaced by a process of step S14. The modified embodiment of the third embodiment configured as stated above exhibits functions and advantageous effects similar to those of the second embodiment.

INDUSTRIAL APPLICABILITY

As stated so far in detail, the multiple differential transmission system according to the present invention can differentially transmit bit information signals of three bits using three signal lines, and differentially transmit multiple bits using fewer signal lines than those used according to the prior arts while suppressing noise increase. In particular, the multiple differential transmission system according to the present invention is applicable as a method of transmitting multiple bits for displaying intended to realize higher image quality than that of the prior arts or a high rate transmission method for apparatus required for downsizing.

The invention claimed is:

1. A signal transmitter for use in a multiple differential transmission system including the signal transmitter, a signal receiver, and a signal transmission path, the signal transmission path including first, second, and third signal lines for connecting the signal transmitter to the signal receiver, the signal transmitter comprising:

a first differential driver for transmitting a first output signal and an inverted first output signal that is a phase-inverted signal with respect to the first output signal, in response to a first bit information signal;

a second differential driver for transmitting a second output signal and an inverted second output signal that is a phase-inverted signal with respect to the second output signal, in response to a second bit information signal; and a third differential driver for transmitting a third output signal and an inverted third output signal that is a phase-inverted signal with respect to the third output signal, in response to a third bit information signal;

wherein the signal transmitter combines the first output signal and the inverted third output signal, and transmits a resulting combined signal to the first signal line, wherein the signal transmitter combines the second output signal and the inverted first output signal, and transmits a resulting combined signal to the second signal line, wherein the signal transmitter combines the third output signal and the inverted second output signal, and transmits a resulting combined signal to the third signal line, wherein an absolute value of binary signal voltages of the first output signal is set to be the same as an absolute value of binary signal voltages of the second output signal, and wherein an absolute value of binary signal voltages of the third output signal is set to be different from an absolute value of binary signal voltages of the first output signal.

2. The signal transmitter as claimed in claim 1,
wherein the absolute value of the binary signal voltages of the third output signal is set to be different from three times as much as the absolute value of the binary signal voltages of the first output signal.

3. The signal transmitter as claimed in claim 2,
wherein the absolute value of the binary signal voltages of the third output signal is set to be higher than half the absolute value of the binary signal voltages of the first output signal.

4. A signal receiver for use in a multiple differential transmission system including a signal transmitter, the signal receiver, and a signal transmission path, the signal transmission path including first, second, and third signal lines for connecting the signal transmitter to the signal receiver, the signal receiver receiving respective output signals from the signal transmitter, wherein the signal transmitter comprises:
a first differential driver for transmitting a first output signal and an inverted first output signal that is a phase-inverted signal with respect to the first output signal, in response to a first bit information signal;
a second differential driver for transmitting a second output signal and an inverted second output signal that is a phase-inverted signal with respect to the second output signal, in response to a second bit information signal; and
a third differential driver for transmitting a third output signal and an inverted third output signal that is a phase-inverted signal with respect to the third output signal, in response to a third bit information signal;
wherein the signal transmitter combines the first output signal and the inverted third output signal, and transmits a resulting combined signal to the first signal line,
wherein the signal transmitter combines the second output signal and the inverted first output signal, and transmits a resulting combined signal to the second signal line,
wherein the signal transmitter combines the third output signal and the inverted second output signal, and transmits a resulting combined signal to the third signal line,
wherein an absolute value of binary signal voltages of the first output signal is set to be the same as an absolute value of binary signal voltages of the second output signal,
wherein an absolute value of binary signal voltages of the third output signal is set to be different from an absolute value of binary signal voltages of the first output signal,
wherein the absolute value of the binary signal voltages of the third output signal is set to be different from three times as much as the absolute value of the binary signal voltages of the first output signal, wherein the absolute value of the binary signal voltages of the third output signal is set to be higher than half the absolute value of the binary signal voltages of the first output signal, wherein the signal receiver comprises:
a first differential receiver for detecting a polarity of a terminal voltage generated across a first terminal resistance connected between the first signal line and the second signal line, and outputting a detection result as a first bit information signal;
a second differential receiver for detecting a polarity of a terminal voltage generated across a second terminal resistance connected between the second signal line and the third signal line, and outputting a detection result as a second bit information signal;
a third differential receiver for detecting a polarity of a terminal voltage generated across a third terminal resistance connected between the third signal line and the first signal line, and outputting a detection result as a third bit information signal,
a comparator for determining whether or not an absolute value of the third terminal voltage generated across the third terminal resistance exceeds a predetermined threshold voltage; and
a controller for outputting the first, the second, and the third bit information signals outputted from the first, the second, and the third differential receivers, respectively when the absolute value of the third terminal voltage does not exceed the predetermined threshold voltage, the controller outputting the third bit information signal outputted from the third differential receiver as all the first, the second, and the third bit information signals each having zero or one when the absolute value of the third terminal voltage exceeds the predetermined threshold voltage, and
wherein the threshold voltage is set to be higher than an absolute value of a difference between the binary signal voltage of the first output signal and the binary signal voltage of the third output signal.

5. A multiple differential transmission system comprising a signal transmitter, a signal receiver, and a signal transmission path, the signal transmission path including first, second, and third signal lines for connecting the signal transmitter to the signal receiver, the signal receiver receiving respective output signals from the signal transmitter, wherein the signal transmitter comprises:
a first differential driver for transmitting a first output signal and an inverted first output signal that is a phase-inverted signal with respect to the first output signal, in response to a first bit information signal;
a second differential driver for transmitting a second output signal and an inverted second output signal that is a phase-inverted signal with respect to the second output signal, in response to a second bit information signal; and
a third differential driver for transmitting a third output signal and an inverted third output signal that is a phase-inverted signal with respect to the third output signal, in response to a third bit information signal;
wherein the signal transmitter combines the first output signal and the inverted third output signal, and transmits a resulting combined signal to the first signal line,
wherein the signal transmitter combines the second output signal and the inverted first output signal, and transmits a resulting combined signal to the second signal line, wherein the signal transmitter combines the third output signal and the inverted second output signal, and transmits a resulting combined signal to the third signal line, wherein an absolute value of binary signal voltages of the first output signal is set to be the same as an absolute value of binary signal voltages of the second output signal, wherein an absolute value of binary signal voltages of the third output signal is set to be different from an absolute value of binary signal voltages of the first output signal, wherein the absolute value of the binary signal voltages of the third output signal is set to be different from three times as much as the absolute value of the binary signal voltages of the first output signal, wherein the absolute value of the binary signal voltages of the third output signal is set to be higher than half the absolute value of the binary signal voltages of the first output signal, wherein the signal receiver comprises:

a first differential receiver for detecting a polarity of a terminal voltage generated across a first terminal resistance connected between the first signal line and the second signal line, and outputting a detection result as a first bit information signal;

a second differential receiver for detecting a polarity of a terminal voltage generated across a second terminal resistance connected between the second signal line and the third signal line, and outputting a detection result as a second bit information signal;

a third differential receiver for detecting a polarity of a terminal voltage generated across a third terminal resistance connected between the third signal line and the first signal line, and outputting a detection result as a third bit information signal, a comparator for determining whether or not an absolute value of the third terminal voltage generated across the third terminal resistance exceeds a predetermined threshold voltage; and a controller for outputting the first, the second, and the third bit information signals outputted from the first, the second, and the third differential receivers, respectively when the absolute value of the third terminal voltage does not exceed the predetermined threshold voltage, the controller outputting the third bit information signal outputted from the third differential receiver as all the first, the second, and the third bit information signals each having zero or one when the absolute value of the third terminal voltage exceeds the predetermined threshold voltage, and wherein the threshold voltage is set to be higher than an absolute value of a difference between the binary signal voltage of the first output signal and the binary signal voltage of the third output signal.

* * * * *